(12) United States Patent
Savry (10) Patent No.: US 11,232,194 B2
(45) Date of Patent: Jan. 25, 2022

(54) METHOD FOR EXECUTING A BINARY CODE OF A SECURE FUNCTION WITH A MICROPROCESSOR

(71) Applicant: Commissariat a l'Energie Atomique et aux Energies Alternatives, Paris (FR)

(72) Inventor: Olivier Savry, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 20 days.

(21) Appl. No.: 16/918,144

(22) Filed: Jul. 1, 2020

(65) Prior Publication Data
US 2021/0004456 A1 Jan. 7, 2021

(30) Foreign Application Priority Data

Jul. 5, 2019 (FR) ..................................... 19 07498

(51) Int. Cl.
*G06F 21/54* (2013.01)
*G06F 9/24* (2006.01)
*G06F 21/60* (2013.01)

(52) U.S. Cl.
CPC ................ *G06F 21/54* (2013.01); *G06F 9/24* (2013.01); *G06F 21/602* (2013.01)

(58) Field of Classification Search
CPC ........... G06F 21/54; G06F 9/24; G06F 21/602
See application file for complete search history.

(56) References Cited

U.S. PATENT DOCUMENTS

| 9,092,618 B2 * | 7/2015 | Fischer ............ G06K 19/07363 |
| 10,148,671 B2 * | 12/2018 | Le ........................... H04L 63/14 |
| 10,650,151 B2 | 5/2020 | Savry |

(Continued)

FOREIGN PATENT DOCUMENTS

| EP | 2 280 365 A1 | 2/2011 |
| EP | 3 457 620 A1 | 3/2019 |
| GB | 2547249 A | 8/2017 |

OTHER PUBLICATIONS

French Preliminary Search Report dated Apr. 2, 2020 in French Application 19 07498 filed on Jul. 5, 2019 (with English Translation of Categories of Cited Documents & Written Opinion), 10 pages.

(Continued)

*Primary Examiner* — Samson B Lemma
*Assistant Examiner* — Zoha Piyadehghibi Tafaghodi
(74) *Attorney, Agent, or Firm* — Oblon, McClelland, Maier & Neustadt, L.L.P.

(57) ABSTRACT

A method for executing a binary code of a secure function includes obtaining a pointer containing: a first range of bits containing the address of a line of code, and a second, different range of bits containing an identifier of the pointer, storing the line of code, this line of code containing a first integrity tag constructed or encrypted using the identifier of the pointer, loading the line of code from the address contained in the first range of bits of the pointer, verifying the integrity of the loaded line of code by constructing a second integrity tag using the identifier of the pointer contained in the second range of bits of the pointer used to load it.

15 Claims, 4 Drawing Sheets

(56) References Cited

U.S. PATENT DOCUMENTS

| | | | |
|---|---|---|---|
| 2007/0106519 A1* | 5/2007 | Giraud | G06Q 40/00 726/22 |
| 2011/0022854 A1 | 1/2011 | Macchetti et al. | |
| 2012/0192283 A1* | 7/2012 | Gu | G06F 21/54 726/26 |
| 2019/0026236 A1 | 1/2019 | Barnes | |
| 2019/0087566 A1 | 3/2019 | Hosie | |
| 2019/0130120 A1* | 5/2019 | Lal | G06F 9/45558 |

OTHER PUBLICATIONS

Austin et al., "Efficient Detection of All Pointer and Array Access Errors", SIGPLAN 94-6/94, 1994, pp. 290-301.

Necula et al., "CCured: Type-Safe Retrofitting of Legacy Code", POPL' 02, Jan. 16-18, 2002, pp. 128-139.

Devietti et al., "HardBound: Architectural Support for Spatial Safety of the C Programming Language", ASPLOS' 08, Mar. 1-5, 2008, pp. 1-12.

Menon et al., "Shakti-T: A RISC-V Processor with Light Weight Security Extensions", HASP' 17, Jun. 25, 2017, 9 pages.

Kwon et al., "Low-Fat Pointers: Compact Encoding and Efficient Gate-Level Implementation of Fat Pointers for Spatial Safety and Capability-based Security", CCS' 13, Nov. 4-8, 2013, 12 pages.

Duck et al., "Stack Bounds Protection with Low Fat Pointers", NDSS' 17, Feb. 26-Mar. 1, 2017, 15 pages.

Duck et al., "Heap Bounds Protection with Low Fat Pointers", CC' 16, Mar. 17-18, 2016, pp. 132-142.

Kroes et al., "Delta Pointers: Buffer Overflow Checks Without the Checks", EuroSys' 18, Apr. 23-26, 2018, 14 pages.

Kroes et al., "Fast and Generic Metadata Management with Mid-Fat Pointers", EuroSec' 17, Apr. 23, 2017, 6 pages.

Dang et al. "The Performance Cost of Shadow Stacks and Stack Canaries", ASIA CCS' 15, Apr. 14-17, 2015, pp. 1-12.

Xu et al., "Architecture Support for Defending Against Buffer Overflow Attacks", 2002, 8 pages.

Abadi et al., "Control-Flow Integrity Principles, Implementations, and Applications", ACM Journal Name, vol. V, No. N, Feb. 2007, 41 pages.

Cowan et al., "StackGuard: Automatic Adaptive Detection and Prevention of Buffer-Overflow Attacks", Proceedings of the $7^{th}$ USENIX Security Symposium, Jan. 26-29, 1998, 16 pages.

De Clercq et al., "SOFIA: Software and control flow integrity architecture", Computers & Security vol. 68, 2017, pp. 16-35.

\* cited by examiner

METHOD FOR EXECUTING A BINARY CODE OF A SECURE FUNCTION WITH A MICROPROCESSOR

The invention relates to a method for executing a binary code of a secure function with a microprocessor. The invention also relates to:

a binary code of a secure function, a data storage medium and a microprocessor for implementing this executing method, and a compiler for generating this binary code.

To obtain information on a binary code or to cause the binary code to operate in an unexpected way, many attacks are possible.

Certain of these attacks are based on erroneous use of a data pointer. It will be recalled here that a data pointer is a datum that contains the address of the datum to be processed and not directly the value of the processed datum.

The use of such data pointers is frequent in an executable code. For example, such a pointer is used to point to the first cell of a table containing a plurality of cells. Next, to process the following cell of this table, it is enough to simply increment the address contained in the pointer by a preset amount.

During the design of the source code, the pointer is provided to manipulate and process a data group of a preset size. However, during the execution of the corresponding binary code, it is sometimes possible to arrange for this pointer to point to a datum located outside of this data group. For example, such an erroneous use of this pointer is caused by inputting, into an input field, a datum the size of which is much larger than that initially provided for by the developers of the secure function. Thus, it is possible to write data to address ranges that should not be written to. In other words, the pointer is used to point to invalid addresses. An example of this first type of attack is known as a "stack overflow attack", when this attack targets the stack used by the secure function. When the pointer is used to write data before the address range provided to this end in the stack, the attack is also known as a stack underflow attack.

This first type of attack may be quite similarly employed to write data to invalid addresses in other parts of the memory than the stack, such as, for example, to the part known as the "heap".

These first types of attacks have in common use of a valid pointer to point to invalid addresses. They are then said to regard infringement of the field of "spatial safety".

Pointers may also be erroneously used to infringe the field of temporal safety. In this case, an invalid pointer is used to point to a valid address. An invalid pointer is a pointer that was used in a valid way to process data in a limited context, and that is then used again outside of this limited context. This may occur if, for example, this pointer was not correctly reset or initialized. This type of invalid pointer is known as a dangling pointer.

Certain attacks therefore locate these invalid pointers, then use them to read or write data at times at which they should not be used to do so. By way of illustration of this second type of attack, mention may be made of the attack known as a use-after-free attack.

It will further be noted that attacks based on erroneous use of pointers do not pertain solely to data pointers, i.e. pointers that point to a datum to be processed by the microprocessor. This type of attack also pertains to the type of pointers referred to here as "function pointers", i.e. a pointer that contains the address not of a datum, but of an instruction to be executed by the microprocessor.

A plurality of solutions have already been proposed to make erroneous use of a pointer more difficult.

For example, one solution consists in using enriched pointers such as, for example, pointers known as low-fat pointers. In this case, each pointer contains, in addition to the address of the datum to which it points, a range of bits containing at least one upper or lower limit. Then, each time this pointer is used, a detection mechanism is employed to detect whether the current address to which this pointer is pointing exceeds, for example, the upper limit. In response to such an exceedance, an error is flagged. Thus, an erroneous use of this pointer is detected. An example of implementation of such an enriched pointer is described in the following article: T. Kroes et al.: "Delta Pointers: Buffer Overflow Checks Without the Checks", in *Proceedings of the Thirteenth EuroSys Conference*, New York, N.Y., USA, 2018, p. 22:1-22:14.

These solutions work correctly for a very precise type of attack or for a limited number of attacks. For example, the solution described in the article by T. Kroes et al. works solely against stack overflow attacks, but does not work against stack underflow attacks. It also does not work against attacks pertaining to the field of temporal security, such as use-after-free attacks.

Prior art is also known from EP2280365A1, GB2547249A and US2019/087566A1.

The invention aims to provide a method for executing, with a microprocessor, a secure function that is robust with respect to a broader spectrum of attacks based on erroneous use of a pointer.

The subject of the invention is therefore such a method for executing a binary code of a secure function with a microprocessor.

Another subject of the invention is a binary code of a secure function able to be executed by a microprocessor, implementing the above executing method.

Another subject of the invention is a data storage medium, readable by a microprocessor, this data storage medium containing the above binary code.

Another subject of the invention is a microprocessor for implementing the above method.

Lastly, another subject of the invention is a compiler able to automatically convert a source code of a secure function into a binary code.

The invention will be better understood on reading the following description, which is given, merely by way of non-limiting example, with reference to the drawings, in which.

SECTION I: CONVENTIONS, NOTATIONS AND DEFINITIONS

In the figures, the same references have been used to designate the same elements. In the rest of this description, features and functions well known to those skilled in the art are not described in detail.

In this description, the following definitions have been adopted.

A "program" designates a set of one or more predefined functions that it is the aim to make a microprocessor execute.

A "source code" is a representation of the program in a computer language, not being directly executable by a microprocessor and being intended to be converted by a compiler into a machine code directly executable by the microprocessor.

A program or code is said to be "directly executable" when it can be executed by a microprocessor without this microprocessor needing beforehand to compile it by means of a compiler or to interpret it by means of an interpreter.

An "instruction" designates a machine instruction executable by a microprocessor.

Such an instruction consists of:
an opcode, or operation code, coding the nature of the operation to be executed, and
one or more operands defining the one or more values of the parameters of this operation.

A "machine code" is a set of machine instructions. It is typically a question of a file containing a succession of bits having the value "0" or "1", these bits coding the instructions to be executed by the microprocessor. The machine code is directly executable by the microprocessor, i.e. without requiring compilation or interpretation beforehand.

A "binary code" is a file containing a succession of bits having the value "0" or "1". These bits code data and instructions to be executed by the microprocessor. Thus, the binary code contains at least one machine code and in addition, generally, digital data processed by this machine code.

To be executed by a microprocessor, the binary code is stored in lines of a main memory. Typically, the binary code contains several hundred or thousand lines. Each of these lines is called a "line of code". Each line of code is stored at an address that is specific thereto in the main memory. Each line of code contains a single instruction or a single datum. Below, when the code contained in the line of code corresponds to an instruction, the line of code is called an "instruction line". When the code contained in the line of code corresponds to a datum, the line of code is called a "data line". The term "code" is for its part used to designate either an instruction or a datum and the term "line of code" is used to designate either a data line or an instruction line.

In the binary code, an instruction and a datum both correspond to bits. However, the instructions and data are not processed in the same way by a microprocessor. For example, an instruction is only loaded then executed by the microprocessor when the program counter points to this instruction. A datum is loaded by the microprocessor only in response to the execution by this microprocessor of an instruction to load this datum.

Execution of a function is spoken of to designate the execution of the instructions that perform this function.

For the sake of simplicity, in this description and in the figures, the instructions have not been shown in binary form, but rather in a symbolic form expressed in a higher-level language.

SECTION II: ARCHITECTURE OF THE APPARATUS

Figure 1:
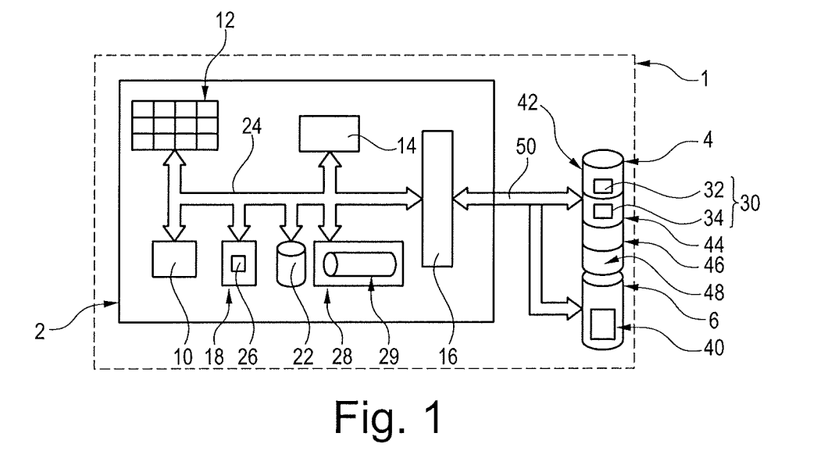
FIG. 1 is a schematic illustration of the architecture of an electronic apparatus able to execute a binary code of a secure function.

FIG. 1 shows an electronic apparatus 1 comprising a microprocessor 2, a main memory 4 and a mass storage device 6. For example, the apparatus 1 is a desktop computer, a smartphone, a tablet computer or the like.

The microprocessor 2 here comprises:
an arithmetic logic unit 10;
a set 12 of registers;
a control module 14;
a data input/output interface 16;
an instruction loader 18 comprising a program counter 26;
a queue 22 of instructions to be executed; and
a hardware security module 28.

The memory 4 is configured to store instructions and data of a binary code 30 of a program that must be executed by the microprocessor 2. The memory 4 is a random-access memory. Typically, the memory 4 is a volatile memory. The memory 4 may be a memory external to the microprocessor 2 as shown in FIG. 1. In this case, the memory 4 is produced on a substrate that is mechanically separate from the substrate on which the various elements of the microprocessor 2 such as the unit 10 are produced.

Here, the memory 4 is divided into successive machine words of set length. Each machine word is individually addressable and may be transferred in a single clock cycle from the memory 4 to a register of the microprocessor via a data bus. To this end, the size $N_{MM}$ of a machine word is equal to the maximum number of bits that may be simultaneously transferred over this data bus. Here, the size $N_{MM}$ is strictly larger than $N_{inst}$ bits, where $N_{inst}$ is the number of bits in the instructions in the set of instructions of the microprocessor 2. Typically, $N_{inst}$ is an integer higher than or equal to 8, 16, 32 or 64. In this example, $N_{inst}$ is equal to 32 and the size $N_{MM}$ is equal to 128 bits.

The position of each machine word in the memory 4 is given by an address. To receive this address, the memory 4 is connected to the microprocessor 2 by an address bus. The size $N_@$ of the address, in number of bits, defines the maximum number of machine words that may be individually addressed in the memory 4. Typically, the size $N_@$ is larger than or equal to 8, 16, 32 or 64 bits. For example, in this embodiment, the size $N_@$ is equal to 64 bits.

Conventionally, the memory 4 is divided into a plurality of parts. For example, here, the memory 4 notably comprises the following parts:
a first part 42 containing the instructions to be executed,
a second part 44 containing data to be processed,
a third part 46 used to back up the execution context of a function when it calls another function referred to as a "routine", and
a fourth part 48 used to dynamically allocate memory to the program in the process of being executed, with a view to storing data therein.

The part 42 is known as the "code segment". The part 44 typically contains static and global variables of the executed program. The part 46 is known as the "call stack". Therefore, below, the part 46 is also called the "stack 46". Lastly, the part 48 is known as the "heap". Thus, below, the part 48 is al so called the "heat 48".

The binary code 30 notably contains a machine code 32 of a secure function and a data block 34 that are required to execute the binary code 30. The machine code 32 and the block 34 are stored in the parts 42 and 44, respectively.

Here, each line of code of the binary code corresponds to one machine word. Thus, one line of code is loaded into a register of the microprocessor 2 in one single read operation. Likewise, one line of code is written to the memory 4 by the microprocessor 2 in one single write operation. The structures of an instruction line and of a data line are described in detail with reference to FIGS. 3 and 5.

The execution of the binary code 30 starts with loading and processing data of the block 34. Here, in particular, the block 34 notably contains a cryptogram ka* obtained by encrypting a secret key ka using a public key $pk_{CPU}$ of the microprocessor 2.

By way of illustration, the microprocessor 2 has a RISC (Reduced Instructions Set Computer) architecture and implements the "RISC-V" instruction set.

Here, the unit 10 is an arithmetic logic unit of $N_{inst}$ bits.

The loader 18 loads, into the queue 22, the next instruction to be executed by the unit 10, from the part 42 of the memory 4. More precisely, the loader 18 loads the instruction to which the program counter 26 points.

The unit 10 is notably configured to execute, one after the other, the instructions loaded into the queue 22. The instructions loaded into the queue 22 are generally systematically executed in the order in which these instructions were stored in this queue 22. The unit 10 is also capable of storing the result of these executed instructions in one or more of the registers of the set 12.

In this description, the expressions "execution by the microprocessor 2", "executing with the microprocessor 2", "execution by the unit 10" and "executing with the unit 10" will be used synonymously.

The module 14 is configured to move data between the set 12 of registers and the interface 16. The interface 16 is notably able to acquire data and instructions, for example, from the memory 4 and/or device 6, which are external to the microprocessor 2.

The module 28 is capable of automatically executing the various operations described in detail in the following sections, to make the execution of the secure functions secure. The module 28 operates independently and without using the unit 10. Thus, it is capable of processing the lines of code before and/or after the later are processed by the unit 10. To this end, it notably comprises a secure non-volatile memory 29. No provision is made for access to this memory 29 except via the module 28. In this embodiment, the module 28 is preprogrammed, for example during its design, to execute operations such as the following operations:
- verifying the integrity and authenticity of a line of code using a MAC (Message Authentication Code),
- constructing a message authentication code,
- encrypting a code to obtain a cryptogram of this code,
- decrypting a cryptogram of a code to obtain the code in cleartext, and
- executing a preprogrammed function $F_{iv}$.

Figure 4:
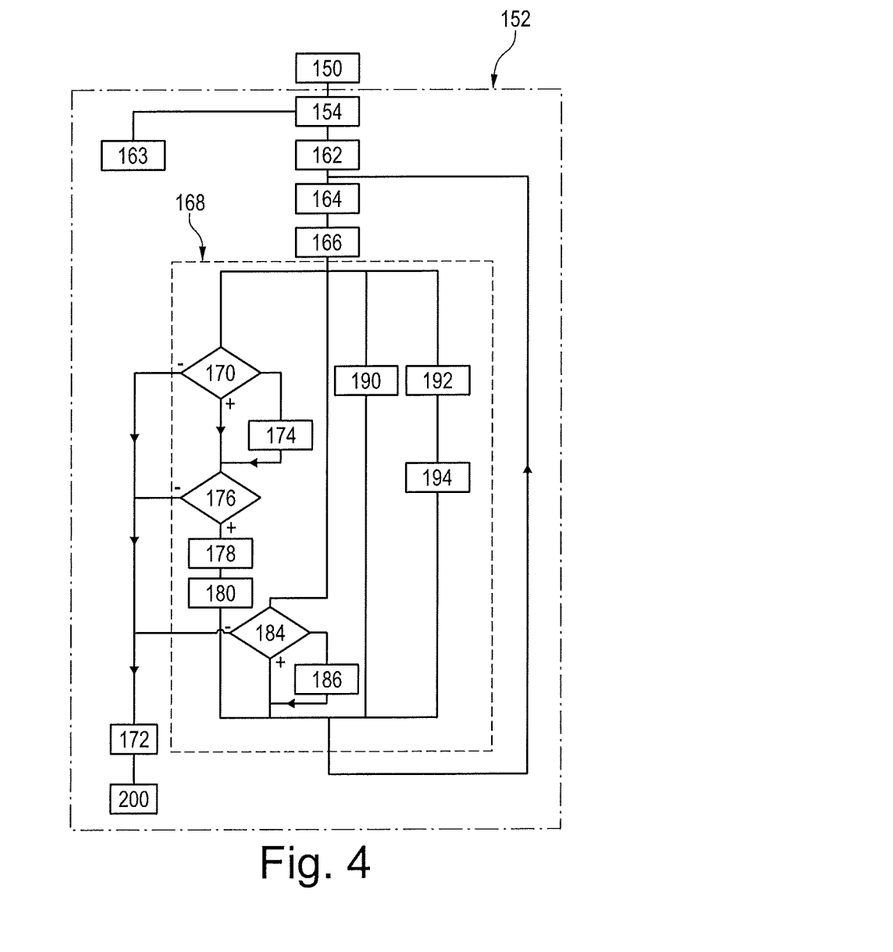
FIG. 4 is a flowchart of a method for executing the binary code with the apparatus of FIG. 1, in which the use of the data pointers is secure.
Figure 6:
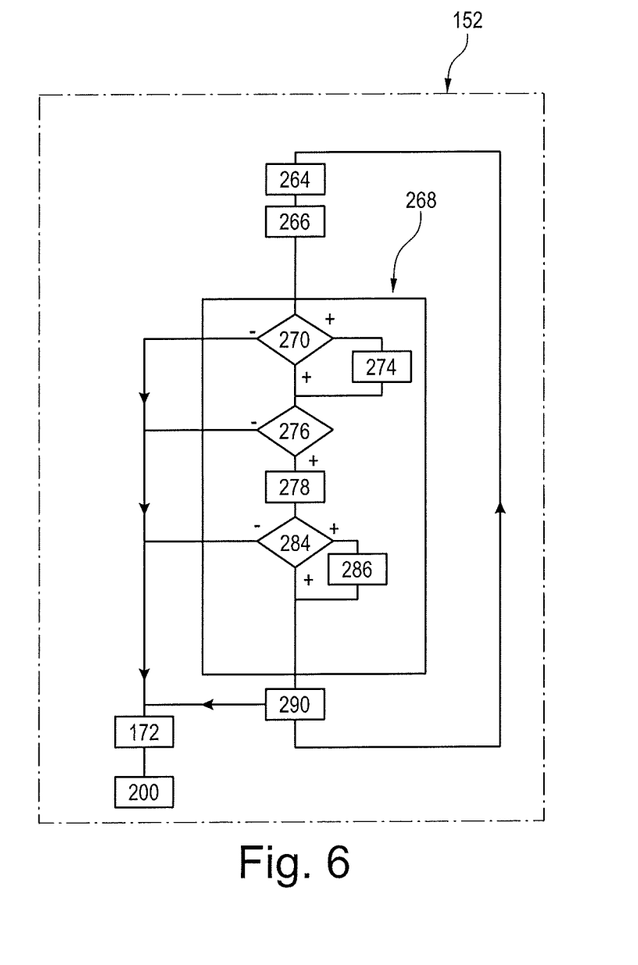
FIG. 6 is a flowchart of a method for executing the binary code with the apparatus of FIG. 1, in which the use of instruction pointers is secure.

The memory 29 is used to store the secret information required to implement the method of FIGS. 4 and 6. Here, it therefore notably contains secret information pre-stored before the start of the execution of the binary code 30. In particular, it contains the following pre-stored information:
- a secret key k' used for the verification of the message authentication codes,
- a private secret key $sk_{CPU}$ that allows data that have been encrypted using the public key $pk_{CPU}$ to be decrypted.

In this exemplary embodiment, the set 12 contains general registers that are usable to store any type of data. The size of each of these registers is, for example, equal to $N_{MM}$.

A data exchange bus 24 that connects the various components of the microprocessor 2 to one another is shown in FIG. 1, in order to indicate that the various components of the microprocessor are able to exchange data with one another. The data bus and the address bus that connect the microprocessor 2 to the memory 4 have been represented by a double-headed arrow 50 to simplify FIG. 1.

The device 6 is typically a non-volatile memory. For example, it is a question of an EEPROM or flash memory. It here contains a backup copy 40 of the binary code 30. Typically, it is this copy 40 that is automatically copied to the memory 4 to restore the code 30, for example, after a power cut or similar or just before the execution of the code 30 starts.

SECTION III: MAKING THE DATA POINTERS SECURE

Data $D_j$ processed during the execution of the machine code 32 are stored in the memory 4. For example, the binary code 30, in addition to the machine code 32, contains data to be processed during the execution of the machine code 32. In addition, during the execution of the machine code 32, the latter generates data to be stored in a static or global variable. These data are typically contained in the part 44 of the memory 4.

Likewise, each time that a calling function triggers the execution of a called function, the execution context of the calling function is backed up in the stack 46. The called function also backs up to the stack 46 data such as local variables.

During the execution of the machine code 32, data may also be stored in the heap 48.

To process and manipulate certain of these data, the machine code 32 uses data pointers. A data pointer is a variable that contains the address of the data line to be processed. The use of a data pointer is, for example, systematic when the datum is stored in the stack 46 or heap 48. As described in the introduction of this application, an erroneous use of a data pointer may be exploited to successfully carry out an attack against the secure function. To detect and thwart such attacks, here, each datum $D_j$ stored in the memory 4 and that is processed using a data pointer, is coded in a respective line $LD_j$. The line $LD_j$ is a data line. Below, in this section, the index j is used to identify the data line $LD_j$ among the other data lines stored in the memory 4. Here, the size of the line $LD_j$ is equal to the size of a machine word and therefore equal to the size $N_{MM}$.

Figure 2:
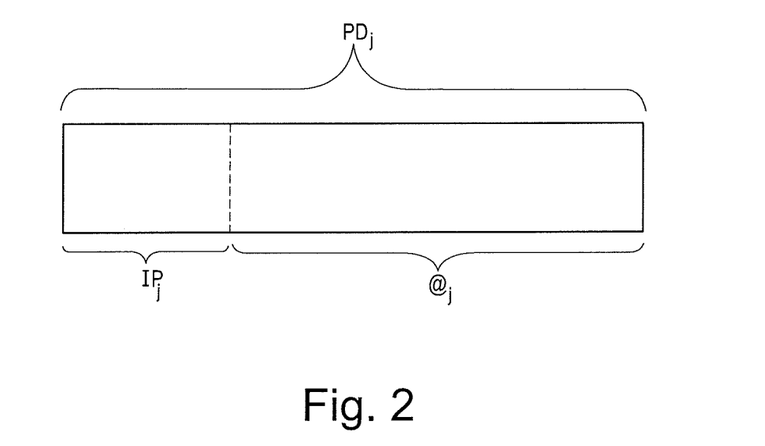
FIG. 2 is a schematic illustration of the structure of an enriched pointer used during the execution of the binary code by the apparatus of FIG. 1.

Below, furthermore, the data pointer that contains the address of the line $LD_j$ and that allows this data line to be processed and manipulated is denoted $PD_j$. The structure of the pointer $PD_j$ is shown in FIG. 2. Here, the size of the pointer $PD_j$ is equal to the size $N_@$ of the memory addresses. The pointer $PD_j$ contains:
- a first range of bits containing the address $@_j$ to which the pointer $PD_j$ points, and
- a second distinct range of bits containing an identifier $IP_j$ of the pointer $PD_j$.

In FIG. 2, the first and second ranges of bits are designated by the symbols $@_j$ and $IP_j$, respectively. Below, the address in the memory 4 at which a line $LD_j$ is stored is denoted $@_j$. The lines $LD_j$ are stored in an address range of the memory 4 the size of which is strictly smaller than $2^{N_@}$ in order to leave sufficient space to code the identifier $IP_j$ inside the pointer $PD_j$. To achieve this, the size of the first range of bits is smaller than $N_@-N_P$ bits, where $N_P$ is the size, in number of bits, of the second range. Preferably, the size $N_P$ is larger than 8 bits or 16 bits and, generally, smaller than 32 bits or 54 bits. Here, the size $N_P$ is equal to 16 bits and the addresses $@_j$ are therefore coded on fewer than 48 bits. In this embodiment, the first range corresponds to the $N_@-N_P$ least significant bits of the pointer $PD_j$ and the second range corresponds to the $N_P$ most significant hits of the pointer $PD_j$. To obtain the address $@_j$ of the line $LD_j$ from the pointer $PD_j$, it is therefore enough to mask the most significant bits of the pointer $PD_j$ that are used to store the identifier $IP_j$.

The address $@_j$ is for example a virtual address in the memory space of the program. Such a virtual address is then automatically converted into a physical address by a unit known as an MMU (Memory Management Unit).

The identifier $IP_j$ is an identifier that allows the pointer $PD_j$ to be uniquely identified among a set of other pointers used during the same execution of the binary code 30. Here, it is constructed so as to limit the probability that two different data pointers have the same pointer identifier. For example, the pointer identifiers are constructed so that this probability is lower than one chance in ten and, preferably, one chance in fifty or one chance in one hundred or one chance in one thousand.

The identifier $IP_j$ may be generated during the compilation of the source code to obtain the binary code 30. This is for example the case when the pointer $PD_j$ is declared in the source code. Conventionally, such a pointer points to a global variable or a static variable or a local variable. During the compilation of the source code, to minimize the probability that two different pointers have the same pointer identifier, for example, the compiler generates the identifier $IP_j$ of the pointer by randomly or pseudo-randomly drawing this identifier from a set EIP. The set EIP contains all the values possible for a pointer identifier except the values already attributed to a pointer identifier. In another embodiment, the identifier $IP_j$ is, each time, randomly or pseudo-randomly drawn from the set EIP. By way of illustration, to do this, in the case of a compiler using a LLVM (Low Level Virtual Machine), the instruction "Alloca" is modified so that the pointer generated at the moment of the compilation of the source code contains an identifier $IP_j$ and an address $@_j$. The instruction "Alloca" generates a pointer that typically points to a local variable stored in the stack 46.

A pointer may also be generated during the execution of the binary code 30. This is notably the case when the binary code contains instructions that, when they are executed by the microprocessor 2, dynamically allocate a free memory region with a view to storing data therein. When such instructions are executed, they generate a pointer that points to the allocated memory region. Here, such instructions are executed by the microprocessor 2 in the step 290 described below with reference to FIG. 6. Such instructions are frequently used to dynamically allocate a memory region in the heap 48. For example, in a source code using the standard libraries of the language C, such instructions correspond to the functions "malloc( )", "calloc( )", "realloc( )", etc. In this case, these functions "malloc( )", "calloc( )", "realloc( )", etc. are modified so that the pointer $PD_j$ that they generate contains, in addition to the address $@_j$, the identifier $IP_j$. Preferably, each execution of such a function must generate an identifier $IP_j$ that is as different as possible from the identifier $IP_j$ generated during the preceding execution of the same function. To achieve this, for example, on each execution of such a function:

the identifier $IP_j$ is drawn, randomly or pseudo-randomly, from the set EIP, or the identifier $IP_j$ is set equal to the digital fingerprint obtained by applying a hash function to the address $@_j$.

Such a pointer $PD_j$ that contains, in addition to the address $@_j$, other information, i.e. here the identifier $IP_j$, is called an "enriched pointer".

The structures of all the lines $LD_j$ intended to be processed using a pointer $PD_j$ are identical. This structure is shown in detail in FIG. 3 in the particular case of the line $LD_j$.

Figure 3:
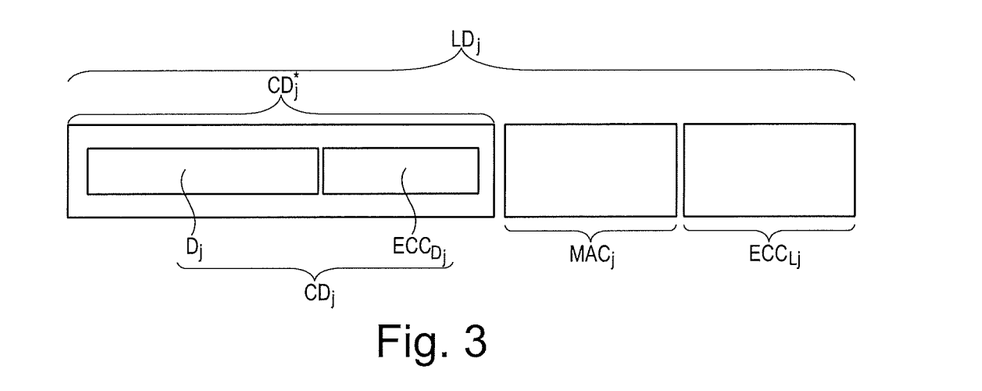
FIG. 3 is a schematic illustration of the structure of a data line used during the execution of the binary code by the apparatus of FIG. 1.

The line $LD_j$ contains a cryptogram $CD_j^*$, a code $MAC_j$, and a code $ECC_{Lj}$.

The cryptogram $CD_j^*$ is obtained by encrypting a concatenation $CD_j$ using the secret key ka and an initialization vector $iv_j$. More precisely, the cryptogram $CD_j^*$ is obtained using the following relationship: $CD_j^* = f_{ka}(CD_j; iv_j)$, where $f_{ka}$ is an encryption function, corresponding to a decryption function $f_{ka}^{-1}$, preprogrammed in the module 28. Typically, the function $f_{ka}$ is a symmetric encryption function. Therefore, the key ka allowing the cryptogram $CD_j^*$ to be decrypted is prestored in the memory 29 in order to allow the module 28 to decrypt this cryptogram $CD_j^*$.

The vector $iv_j$ is a vector the value of which depends on the address $@_j$ and on the identifier $IP_j$ of the pointer $PD_j$. In this embodiment, the vector $iv_j$ is coded on the same number of bits as the pointer $PD_j$.

To this end, the module 28 comprises a preprogrammed function $F_{iv}$ that associates a different value of the vector $iv_j$ with each address $@_j$ and with each identifier $IP_j$. For example, the function $F_{iv}$ is an encryption or hash function. The following relationship is therefore obtained: $iv_j = F_{iv}(@_j IP_j)$.

The concatenation $CD_j$ is here the concatenation of the datum $D_j$ and of a code $ECC_{Dj}$.

The code $ECC_{Dj}$ is a first integrity tag that allows the integrity of the line $LD_j$ to be verified. More precisely, the code $ECC_{Dj}$ allows an error in the datum $D_j$ to be detected and, optionally, this error to be corrected. For example, the code $ECC_{Dj}$ is the code known as BCH (Bose, Ray-Chaudhuri, Hocquenghem) code, which has the advantage of being particularly easy to implement. However, any other known error detection or correction code may be employed. The size of the code $ECC_{Dj}$ is larger than or equal to 1 or 2 or 3 bits and, generally, smaller than $N_{inst}$. The size of the code $ECC_{Dj}$ is determined depending on the desired robustness. The more it is the aim to be capable of correcting a high number of erroneous bits in the datum $D_j$, the larger the code $ECC_{Dj}$ will be in size.

The code $MAC_j$ is a second integrity tag that also allows the integrity of the line $LD_j$ to be verified. More precisely, here, the code $MAC_j$ is a code allowing the integrity and authenticity of the cryptogram $CD_j^*$ to be verified. This code is commonly called a "message authentication code" or MAC. Such a code $MAC_j$ is obtained by constructing a digital fingerprint from the cryptogram $CD_j^*$. This digital fingerprint normally contains fewer bits than the cryptogram $CD_j^*$. Such a digital fingerprint is more commonly called a digest or hash. This digital fingerprint is constructed using a preset function and the secret key k' known only to the author of the binary code 30 and to the microprocessor 2. Here, the key k' is stored beforehand in the memory 29. In addition, in this embodiment, the code $MAC_j$ is also constructed using the address $@_j$ and the identifier $IP_j$. For example, the preset function is a one-way function such as a hash function. In this case, generally, the digital fingerprint is the result of application of this hash function to a combination, for example a concatenation, of the cryptogram $CD_j^*$, of the key k', of the address $@_j$; and of the identifier $IP_j$.

By way of example, to generate the cryptogram $CD_j^*$ and the code $MAC_j$, an authenticated encryption algorithm is used. This authenticated encryption algorithm may be chosen from the various entrants to the CAESAR competition (CAESAR being the acronym of "Competition for Authenticated Encryption: Security, Applicability, and Robustness") such as, for example, one of the algorithms designated by the following names: "ACORN", "ASCON", "SILC", "CLOC", "JAMBU", "KETJE".

The code $ECC_{Lj}$ is an error correction code that allows an error in the cryptogram $CD_j^*$ and the code $MAC_j$ to be detected and corrected. It is for example constructed as described in the case of the code $ECC_{Dj}$.

The line $LD_j$ is constructed at the moment of the generation of the binary code 30 when the address $@_j$ is set at the moment of the compilation. In this case, the compiler firstly generates the identifier $IP_j$ of the pointer $PD_j$ then this identifier $IP_j$ and the address $@_j$ are used to construct the line $LD_j$.

The line $LD_j$ may also be constructed during the execution of the binary code 30. This is the case when the address $@_j$ at which the line $LD_j$ must be stored is known solely at the moment at which the binary code 30 is executed. For example, this situation is encountered when the line $LD_j$ is stored in a memory region dynamically allocated in the heap 48.

FIG. 4 shows a method for executing the binary code 30 with the microprocessor 2.

The method starts with a step 150 of generating then delivering the binary code 30 to the memory 4. The binary code 30 is typically generated by a compiler such as that described with reference to FIG. 7. The delivery of the binary code 30 here then consists in providing the copy 40 then, for example, the microprocessor 2 copying the copy 40 into the memory 4 to obtain the binary code 30 stored in the memory 4. Thus, in the step 150, the lines $LD_j$ constructed during the compilation of the source code and contained in the binary code 30 are stored in the memory 4 and, generally, in the part 44.

Next, during a phase 152, the microprocessor 2 executes the binary code 30 and, in particular, the machine code 32.

Optionally, the execution of the binary code 30 starts with a step 154 of authenticating the author of this binary code. If the authentication is performed successfully, then the method continues with a step 162. In contrast, if the authentication is not performed successfully, the module 28 then considers the authentication of the author of the binary code 30 to have failed and the method continues with a step 163. In the step 163, the execution of the binary code 30 is stopped.

In the step 162, the module 28 notably loads the cryptogram ka* contained in the block 34 and decrypts it using the key $sk_{CPU}$ contained in the memory 29. At the end of the step 162, the key ka is contained in the memory 29.

After the step 162, the microprocessor 2 executes, one after the other, the instructions of the machine code 32.

In this embodiment, the securing of the data pointers occurs each time the instruction executed by the microprocessor 2 is an instruction to read a data line $LD_j$ from the memory 4 at an address $@_j$ specified by the pointer $PD_j$. This read instruction typically contains an operand that contains the address at which the pointer $PD_j$ is stored in the memory 4.

The execution of this read instruction by the microprocessor 2 therefore firstly triggers the pointer $PD_j$ to be loaded into a register, in a step 164.

Next, in a step 166, the microprocessor 2 loads, for example into a register $R_j$ of the microprocessor, the line $LD_j$. The step 166 comprises extracting the address $@_j$ from the loaded pointer $PD_j$. For example, to do this, the address $@_j$ is obtained by masking the bits of the second range of bits of the pointer $PD_j$. This masking operation allows the same address $@_j$ to be obtained as would be obtained if the $N_P$ most significant bits were equal to zero. Next, only the extracted address $@_j$ is transmitted to the memory 4 via the address bus. In response, the memory 4 transmits, over the data bus, the line $LD_j$.

Next, the module 28 proceeds to a step 168 of making the datum $D_j$ and the pointer $PD_j$ secure. To do this, the module 28 successively carries out the following operations.

In an operation 170, the module 28 verifies whether there is an error in the cryptogram $CD_j^*$ or the code $MAC_j$ using the code $ECC_{Lj}$ contained in the loaded line $LD_j$. For example, to do this, the module 28 constructs, with the aid of a preprogrammed function, of the cryptogram $CD_j^*$ and of the code $MAC_j$, a code $ECC_{Lj}'$. If the code $ECC_{Lj}'$ is different from the code $ECC_{Lj}$, then an error is detected. If an error is detected, the module 28 immediately proceeds to a step 172.

In the step 172, the module 28 triggers the flagging of an execution fault.

Here, in parallel to the step 172, if an error is detected, the module 28 proceeds with an operation 174. In the operation 174, it corrects the cryptogram $CD_j^*$ and the code $MAC_j$ based on the information contained in the code $ECC_{Lj}$. At the end of the operation 174, the corrected cryptogram $CD_j^*$ and the corrected code $MAC_j$ are used instead of the cryptogram $CD_j^*$ and code $MAC_j$ contained in the line $LD_j$, respectively.

The operation 170 notably allows faults introduced into the data lines stored in the memory 4 to be detected and corrected.

At the end of the operation 174, or if no error is detected in the operation 170, the method continues with an operation 176.

In the operation 176, the module 28 verifies the integrity of the line $LD_j$. Here, it verifies the integrity and the authenticity of the cryptogram $CD_j^*$ using the code $MAC_j$. To do this, the module 28 constructs a code $MAC'_j$ using the same algorithm as that employed to construct the code $MAC_j$, except that it uses the cryptogram $CD_j^*$ loaded in the step 166. In addition, in the operation 176, the module 28 uses the identifier $IP_j$ and address $@_j$ contained in the pointer $PD_j$ loaded in the step 164. For example, the cryptogram $CD_j^*$ is concatenated with the key k', the address $@_j$ and the identifier $IP_j$. The code $MAC'_j$ is then equal to the digital fingerprint of this concatenation. If the code $MAC'_j$ thus constructed is identical to the loaded code $MAC_j$, then the integrity and authenticity of the cryptogram $CD_j^*$ is continued. In this case, the cryptogram $CD_j^*$ is stored in a register of the microprocessor and the module 28 proceeds, in an operation 178, with its decryption. In the contrary case, the verification of the integrity of the line $LD_j$ fails and the module 28 proceeds with the step 172.

The operation 176 allows the integrity and authenticity of the loaded line $LD_j$ to be validated and also it to be validated that, in the operation 174, the cryptogram $CD_j^*$ and/or the code $MAC_j$ have been corrected correctly. The operation 176 therefore allows a replacement of the line $LD_j$ with a new data line constructed by an author who does not know the key k' to be detected. The operation 176 also allows the permutation of the line $LD_j$ with another line $LD_k$ stored at an address $@_k$ different from the address $@_j$ to be detected.

The operation 176 also allows practically any erroneous use of a pointer to be detected. For example, the operation 176 detects an incorrect use of a pointer $PD_k$ to read the line $LD_j$ or to replace the line $LD_j$ with a new line $LD_k$. More precisely, if another pointer $PD_k$, different from the pointer $PD_j$, is used to read the line $LD_j$, it is the identifier $IP_k$, different from the identifier $IP_j$, contained in the pointer $PD_k$ that is used to construct the code $MAC_j'$. Therefore, the constructed code $MAC_j'$ is different from the code $MAC_j$. This erroneous use of the pointer $PD_k$ therefore triggers the flagging of an execution fault. If the pointer $PD_k$ is used to write a line $LD_k$ in the place of the line $LD_j$, then the code $MAC_k$ of the line $LD_k$ is constructed using the identifier $IP_k$. Next, on the following use of the pointer $PD_j$, the constructed code $MAC_j'$ is different from the code $MAC_k$ because it is the identifier $IP_j$, and not the identifier $IP_k$, that is used. Therefore, this erroneous use of the pointer $PD_k$ is also detected. By virtue of this, buffer overflow attacks are detected.

Likewise, the operation 176 allows use of the pointer $PD_j$ after the memory region containing the line $LD_j$ has been freed to be detected. Specifically, typically, after this memory region has been freed, the latter is reused to store other lines of data therein. To reuse this memory region, a new pointer $PD_k$ is generated then used to store these other lines $LD_k$. This new pointer $PD_k$ contains an identifier $IP_k$ different from the identifier $IP_j$. Next, if the pointer $PD_j$ is used to read the line $LD_k$, this is detected. Specifically, in this case as well, the constructed code $MAC_j'$ will be different from the code $MAC_k$ of the line $LD_k$. Thus, the operation 176 allows attacks using dangling pointers or use-after-free attacks to be detected.

In the operation 178, the module 28 decrypts the cryptogram $CD_j^*$ using the key ka, the initialization vector $iv_j$ and the function $f_{ka}^{-1}$ to obtain the decrypted concatenation $CD_j$ and therefore the decrypted datum $D_j$ and the decrypted code $ECC_{Dj}$. The key ka is the key that was stored in the memory 29 in the step 162. In the operation 178, the vector $iv_j$ is computed by the module 28 using the relationship: $iv_j = F_{iv}(@_j; IP_j)$, where $@_j$ and $IP_j$ are the address and identifier contained in the pointer $PD_j$ loaded in the step 164.

Once the cryptogram $CD_j^*$ has been decrypted, in an operation 180, the module 28 stores the decrypted datum $D_j$ and the decrypted code $ECC_{Dj}$ in the register $R_j$ while waiting for this datum to be processed by the unit 10.

When the next instruction that will be executed by the unit 10 is an instruction that processes the datum $D_j$, the module 28 proceeds with operations 184 and 186. The module 28 identifies that the next instruction to be executed will process the datum $D_j$ because this instruction generally contains an operand that identifies the register $R_j$ in which the datum $D_j$ is stored.

In an operation 184, the module 28 verifies once again the integrity of the line $LD_j$. More precisely, it verifies whether there is an error in the datum $D_j$ contained in the register $R_j$ using the code $ECC_{Dj}$ also contained in this register $R_j$. This operation is carried out in a way similar to that described for the operation 170. This operation 184 allows an attack by fault injection into the register $R_j$ to be detected.

If the module 28 detects an error, then it proceeds immediately with the step 172. In addition, in parallel, in an operation 186, the module 28 corrects the datum $D_j$ using the code $ECC_{Dj}$. The operation 186 is similar to the operation 174.

It will also be noted that, in an embodiment in which the operation 176 is omitted, the operation 184 also allows the same erroneous uses of data pointers as those detectable in the operation 176 to be detected. Specifically, the datum $D_j$ and the code $ECC_{Dj}$ were obtained by decrypting the cryptogram $CD_j^*$, notably using the identifier of the pointer loaded in the step 164. Therefore, if the pointer loaded in this step is not the pointer $PD_j$ but another different pointer $PD_k$, the datum $D_j$ decrypted and the code $ECC_{Dj}$ decrypted in the operation 178 will be incorrect. The verification of the integrity of the line $LD_j$ in the operation 184 therefore fails.

Next, at the end of the operation 186, or if no error was detected in the operation 184, the unit 10 executes the instruction that processes the datum $D_j$.

In parallel, each time the unit 10 executes an instruction that causes a new datum $D_j$ to be stored in a register, denoted $R_j$ here, of the set 12, the module 28 constructs the concatenation $CD_j$ and stores it in the register $R_j$.

Subsequently, the unit 10 executes an instruction to write the datum $D_j$ contained in the register $R_j$ to the address $@_j$ contained in the pointer $PD_j$.

In response, in an operation 192, the module 28 constructs the data line $LD_j$ that must be stored at the address $@_j$. To do this, the module 28:

computes the vector $iv_j$ using the relationship: $iv_j = F_{iv}(@_j, IP_j)$, then constructs the cryptogram $CD_j^*$ using the relationship $CD_j^* = f_{ka}(CD_j; iv_j)$, then computes the code $MAC_j$ with the aid of the cryptogram $CD_j^*$, of the key k', of the address $@_j$ and of the identifier $IP_j$, then computes the code $ECC_{Lj}$ with the aid of the cryptogram $CD_j^*$ and of the code $MAC_j$, then concatenates the cryptogram $CD_j^*$, the code $MAC_j$ and the code $ECC_{Lj}$ to form the line $LD_j$.

Next, in an operation 194, the microprocessor 2 stores the constructed line $LD_j$ in the memory 4 at the address $@_j$. In this operation, the address $@_j$ is extracted from the pointer $PD_j$ as described in the case of the step 166.

During the execution of the binary code, if an erroneous use of a given pointer occurs, the microprocessor 2 flags, in the step 172, a fault in the execution of the binary code 30. In response to such flagging, in a step 200, the microprocessor 2 implements one or more counter-measures. Very many counter-measures are possible. The counter-measures implemented may have very different degrees of severity. For example, the counter-measures implemented may range from simply displaying or simply storing in memory an error message without interrupting the normal execution of the binary code to definitively decommissioning the microprocessor 2. The microprocessor 2 is considered to be decommissioned when it is definitively placed in a state in which it is incapable of executing any binary code. Between these extreme degrees of severity, there are many other possible counter-measures, such as:

indication via a human-machine interface of the detection of faults, immediate interruption of the execution of the binary code and/or its reset, and deletion of the binary code from the memory 4 and/or deletion of the backup copy 40 and/or deletion of the secret data.

In addition, here, the counter-measure implemented in the step 200 may be selected depending on the detected error and therefore depending on the operation that lead to the detection of this fault. For example, the selected counter-measure will not be the same depending on whether the error was detected in the operation 176 or 184.

In this embodiment, the data that are stored in the memory 4 but that are not manipulated using a pointer are encrypted by a conventional encryption method. In this application, these data are designated by the symbol $Da_j$. To ensure the consistency of the notation, the address at which the datum $Da_j$ is stored in the memory 4 is also denoted $@_j$. For example, here, the method employed to encrypt the data $Da_j$ is that described in section V of application EP34577620A. Under these conditions, each datum $Da_j$ is stored in a data line $LDa_j$ the structure of which is identical to that of the line $LD_j$ described above. In addition, preferably, the address $@_j$ of each datum $Da_j$:

has the same size as the address $@_j$ contained in each pointer $PD_j$, and is contained in a machine word of same size as the pointer $PD_j$ and in the same first range of bits.

Thus, the address $@_j$ of a datum $Da_j$ is contained in an operand that has the same structure as the pointer $PD_j$ except that the bits of the second range of bits are systematically zero. Under these conditions, to read from and write to the memory 4 a datum $Da_j$, the same steps as those described below in the particular case of a datum $D_j$ are carried out. Specifically, the only difference is that, in the case of a datum $Da_j$, to obtain its address $@_j$ from the operand of the read instruction, it is not necessary to mask the second range of bits of the operand since said range is systematically equal to zero. However, the fact of executing the operation of masking the second range of bits changes nothing as regards the result and the address $@_j$ of the datum $Da_j$ is correctly obtained from the operand of the read instruction.

In this embodiment, when a pointer $PD_j$ is stored in the memory 4 and is not itself manipulated using another pointer, this pointer $PD_j$ is a datum $Da_j$ and therefore treated as such. The pointer $PD_j$ is therefore stored in encrypted form in the memory 4. Therefore, in the step 164, the data line coding this pointer $PD_j$ is loaded and decrypted in the same way as for a datum $Da_j$.

When a pointer $PD_j$ is stored in the memory 4 and is itself manipulated using another pointer, this pointer $PD_j$ is a datum $D_j$ and therefore treated as such. This pointer $PD_j$ is therefore also stored in encrypted form in the memory 4. In contrast, in the step 164, the data line coding this pointer $PD_j$ is loaded and decrypted in the same way as for a datum $D_j$ and not as in the case of a datum $Da_j$. Thus, the method also works when a data pointer itself points to another data pointer. This situation is known as "pointer to pointer".

SECTION IV: SECURING OF TI-IE FUNCTION POINTERS

The machine code 32 contains a succession of instruction lines $LI_j$ stored one after another in the memory 4. In contrast to the data lines $LD_j$ described above, the line $LI_j$ codes an instruction $I_j$ to be executed by the unit 10 and not a datum $D_j$ to be processed. Below, in this section, the index j is used to identify the instruction line $LI_j$ among the other instruction lines of the machine code 32. In addition, the index j is also used as an order number indicating in which order the lines $LI_j$ are classed. Thus, the instruction line located immediately after the line $LI_j$ is denoted $LI_{j+1}$. Each instruction line $LI_j$ codes one instruction of the instruction set of the microprocessor 2, able to be executed, after having been decrypted and decoded, by the unit 10 of this microprocessor.

A binary code may contain function pointers. In contrast to a data pointer, a function pointer contains the address of an instruction line containing an instruction to be executed by the microprocessor. Thus, when a function pointer is read this causes the address that it contains to be loaded into the program counter 26. The execution of the binary code therefore continues with the execution of the instruction pointed to by this function pointer. These function pointers are therefore used to call routines from the code of a main function. These routines are also called "called functions".

By way of illustration, such function pointers are used in the following cases:

Case 1): A function pointer is introduced by the compiler when it encounters, in the source code, certain particular instructions. For example, the instruction "SWITCH" may lead to the creation, by the compiler, of an association table that associates one particular function pointer with each case provided for by the instruction "SWITCH". During the execution of the corresponding binary code, the microprocessor identifies the encountered case, then reads, from the association table, the pointer associated with this identified case.

Case 2): The use of function pointers is also frequently encountered in the context of object programming. In this context, the source code may define a class of objects and, for this class of objects, a plurality of methods. These various methods of a class are then often called in the machine code using a mechanism known as a vtable or virtual method table. This mechanism uses a table that associates a pointer that points to the first instruction of this method with each method identifier.

Case 3): When a function A calls a predefined function B from a library of pre-stored functions, a table is used to associate a pointer that points to the address of the first instruction of the function B with the identifier of the function B, which identifier is contained in the binary code of the function A. In this case, generally, the pointer that points to the function B is generated by a dynamic library loader at the moment at which the execution of the function A starts.

Case 4): It is also possible to declare function pointers in a source code.

To make these function pointers secure against erroneous use, the structure of the function pointers is identical to that described with reference to FIG. 2. Below, the symbols $PF_f$, $IP_f$ and $@_f$ are used to designate a function pointer, the identifier of this function pointer and the address to which this function pointer points, respectively. The index f is an identifier of the function pointed to by the pointer $PF_f$.

The function pointers are generated during the compilation of the source code and/or during the execution of the binary code. To do this, the instructions of the compiler and/or the instructions executed by the microprocessor 2 that generate such function pointers are designed to:

generate the identifier $IP_f$ that allows the pointer $PF_f$ to be uniquely identified among a set of other function pointers used during the same execution of the binary code 30, and construct and return a pointer $PF_f$ containing the identifier $IP_f$ and the address $@_f$.

Figure 5:
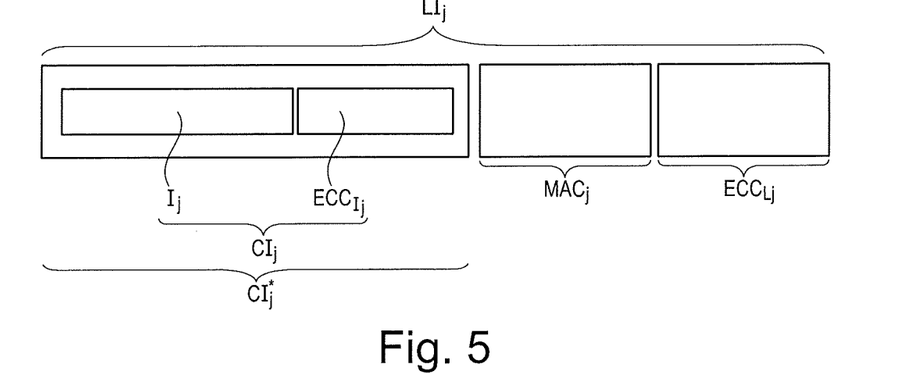
FIG. 5 is a schematic illustration of the structure of an instruction line of the binary code executed by the apparatus of FIG. 1.

The structure of each instruction line $LI_j$ of each function pointed to by a pointer $PF_f$ is shown in FIG. 5. This structure is identical to that of a line $LD_j$. However, in the context of an instruction line $LI_j$, the symbols $I_j$, $ECC_j$, $CI_j$ and $CI_j^*$ are used to designate the instruction coded in this line, the error correction code associated with this instruction $I_j$, the concatenation of the instruction $I_j$ and of the code $ECC_{Ij}$ and the cryptogram of this concatenation, respectively.

Below, the same symbol $@_j$ is used to designate the address at which the line $LI_j$ is stored.

The code $ECC_{Ij}$ of the line $LI_j$ is constructed as described for the code $ECC_{Dj}$ except that the datum $D_j$ is replaced by the instruction $I_j$.

The cryptogram $CI_j^*$ is constructed like the cryptogram $CD_j^*$ except that the identifier $IP_j$ is replaced by the identifier $IP_f$ of the pointer that points to the function that contains this line $LI_j$. Thus, all the lines $LI_j$ of a given function addressed using the pointer $PF_f$ are encrypted using the same identifier $IP_f$. The cryptogram $CI_j^*$ is therefore constructed using the function $f_{ka}$, the key ka, the address $@_j$ and the identifier $IP_f$.

The code $MAC_j$ is constructed like the code $MAC_j$ of a data line except that the cryptogram $CD_j^*$ and the identifier $IP_j$ are replaced by the cryptogram $CI_j^*$ and the identifier $IP_f$, respectively. The code $MAC_j$ of the line $LI_j$ is therefore constructed using the cryptogram $CI_j^*$, the key k', the address $@_j$ and the identifier $IP_f$.

The code $ECC_{Ij}$ is constructed like the code $ECC_{Lj}$ of a data line except that the cryptogram $CD_j^*$ is replaced by the cryptogram $CI_j^*$.

The vector $iv_j$ used to construct the line $LI_j$ is a vector the value of which depends on the address $@_j$ of the line $LI_j$ and on the identifier $IP_f$ of the pointer $PF_f$. To this end, for example, the following relationship is used: $iv_j = F_{iv}(@_j, IP_f)$.

The securing of the function pointers will now be described in more detail with reference to the method of FIG. 6 and in the particular case where it is implemented in combination with the teachings of the preceding sections. Here, the instruction pointers are secured each time the instruction to be executed is loaded using a function pointer.

More precisely, in this case, in a step 264, the microprocessor 2 loads the pointer $PF_f$ into the program counter 26.

Next, in a step 266, the microprocessor 2 successively loads each of the lines $LI_j$ of the called function starting with the line $LI_f$ stored at the address $@_f$ contained in the pointer $PF_f$. To do this, the address $@_f$ is extracted from the loaded pointer $PF_f$, for example as described in the case of the step 166. After this, the address $@_f$ is transmitted to the memory 4 via the address bus. The address $@_j$ of the following line $LI_j$ is for example obtained by incrementing the program counter. The fact of incrementing the program counter modifies the address that it contains but does not modify the identifier $IP_f$ contained in this program counter.

Next, the module 28 proceeds with a step 268 of making the instruction and pointer $PF_f$ secure. To do this, the module 28 successively carries out operations 270, 274, 276, 278, 284 and 286 for each of the instruction lines $LI_j$ of the function called using the pointer $PF_f$. These operations 270, 274, 276, 278, 284 and 286 are identical to the operations 170, 174, 176, 178, 184 and 186 described above, respectively, except that the symbols $D_j$, $ECC_{Dj}$, $CD_j$ and $CD_j^*$ are replaced by the symbols $I_j$, $ECC_{Ij}$, $CI_j$ and $CI_j^*$, respectively.

After the operation 278, the module 28 stores the decrypted instruction $I_j$ and the decrypted code $ECC_{Ij}$ in the queue 22. Once the unit 10 has executed all the instructions that precede the instruction $I_j$ in the queue 22, i.e. when the instruction $I_j$ is the next instruction to be executed by the unit 10, the module 28 triggers the execution of the operations 284 and, optionally, 286. Next, in a step 290, the unit 10 executes the instruction $I_j$.

SECTION V: SECURING OF INVALID POINTERS

In addition to what has already been described previously, in a preferred embodiment, instructions that free a memory region are modified to make an invalid pointer unusable. Here, these instructions are executed by the microprocessor 2 in the step 290.

For example, the instruction that frees a memory region is the instruction "Free" of the language C. In the source code, the instruction "Free" typically takes the form "Free($PD_j$)", where "$PD_j$" is the pointer that points to the freed memory region. Once the instruction "Free($PD_j$)" has been executed, the memory region freed in the memory 4 may again be allocated and used to store other data lines $LD_k$ therein.

After the execution of the instruction "Free($PD_j$)", the pointer $PD_j$ is invalid and must therefore no longer be used to access this freed memory region.

Here, to avoid any use of the invalid pointer $PD_j$, the instruction "Free" is modified so that, when it is executed, in the step 290, by the microprocessor 2, the identifier $IP_j$ of the pointer $PD_j$ is then also modified. Thus, if the pointer $PD_j$ is used outside of the time period during which it is valid, this systematically triggers an execution fault. Specifically, in this case, even if the pointer $PD_j$ is used to read, from the freed memory region, the line of code $LD_j$ that was previously written using this pointer $PD_j$, the new value of the identifier $IP_j$ is then different from its preceding value. The verification, in the operation 176, of the integrity of the line $LD_j$ therefore fails.

In addition, the instruction "Free" may also be modified to erase the lines of code written in the freed memory region. For example, to do this, these lines of code are overwritten with random values or zeros. For example, to do this, the lines written to the freed memory region are written using the new value of the identifier $IP_j$ of the pointer $PD_j$.

SECTION VI: GENERATION OF THE BINARY CODE

Figure 7:
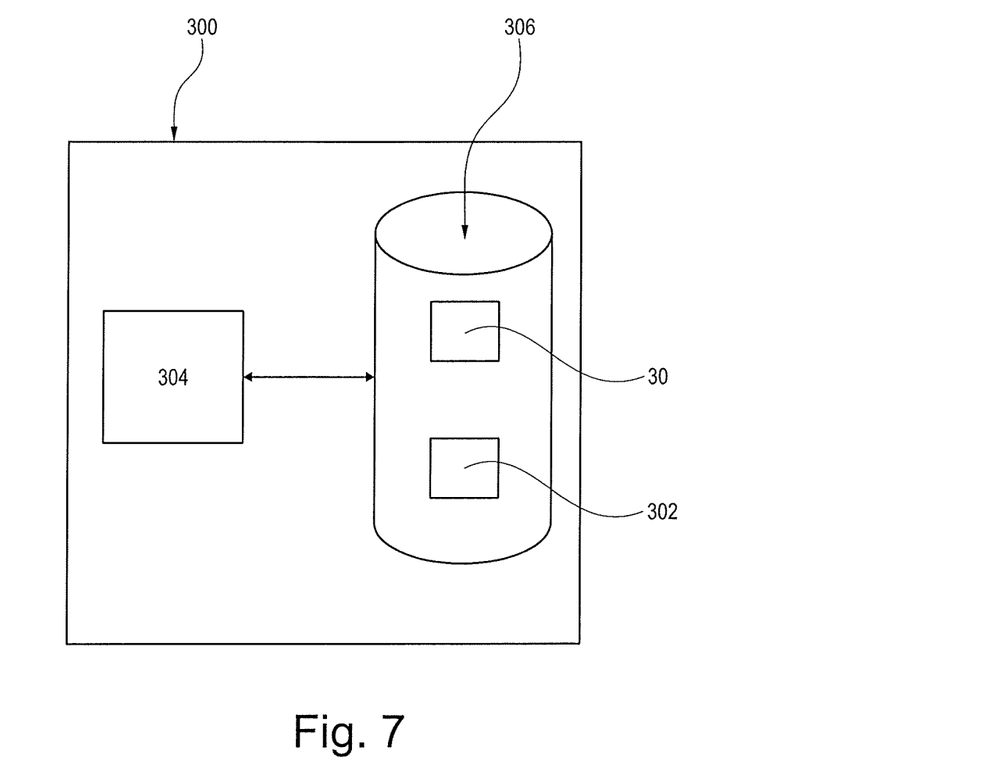
FIG. 7 is a schematic illustration of a compiler able to generate the binary code executed by the apparatus of FIG. 1.

FIG. 7 shows a compiler 300 able to automatically generate the binary code 30 from a source code 302. To this end, the compiler 300 typically comprises a programmable microprocessor 304 and a memory 306. The memory 306 contains the instructions and the data required, when they are executed by the microprocessor 304, to automatically generate the binary code 30 from the source code 302. In particular, during the compilation of the source code 302, the microprocessor 304 automatically generates the pointers $PD_1$ for the lines $LD_j$ and the pointers $PF_f$ for the lines $LI_f$. More precisely, during the compilation, the compiler generates, for each of these pointers, the corresponding pointer identifier, then constructs the line pointed to by this pointer using this identifier. The design and production of such a compiler are within the scope of a person skilled in the art on the basis of the explanations given in this description. For example, to do this, the compiler 30 automatically locates and identifies the pointers and the lines of code that are processed using these pointers. For example, the compiler 300 is a compiler that uses the LLVM abstraction layer.

SECTION VII: VARIANTS

Variants of the Apparatus 1:

Other embodiments of the apparatus 1 are possible. In particular, all the variants described in paragraphs 191 to 194 of application EP3457620A1 are applicable here.

In the case where only the data pointers are made secure, the module 28 may be replaced by a software module that, when it is executed by the unit 10, performs the same functions and operations as those described with respect to the module 28.

Variants of the Securing of the Data Pointers:

The various variants described in the section "Variances de la sécurisation des données" of application EP3457620A1 may be transposed without difficulty to the context of the present application. In particular, the code $ECC_{Dj}$ may be replaced by a simple error detection code only allowing an error in the datum $D_j$ to be detected. An error detection code does not allow the detected error to be corrected. In this case, the error-correcting operation 186 is omitted.

In one simplified variant, the code $ECC_{Dj}$ is omitted. In this embodiment, the microprocessor 2 is no longer capable of detecting an error in the decryption of the cryptogram $CD_j^*$ or a modification of the datum $D_j$ after its decryption and before its use by the unit 10. In this case, the operations 184 and 186 are omitted.

In the embodiments described up to now, both the datum $D_j$ and the code $ECC_{Dj}$ are encrypted using the vector $iv_j$. As a variant, either only the datum $D_j$ or only the code $ECC_{Dj}$ is encrypted using the vector $iv_j$. For example, in the data line, the cryptogram of the datum $D_j$ is obtained from an encryption function that does not use the vector $iv_j$, whereas the cryptogram $ECC_{Dj}^*$ of the code $ECC_{Dj}$ is obtained using the encryption function $f_{ka}(ECC_{Dj}; iv_j)$. In this case, in the operation 178, the module 28 decrypts the cryptogram of the datum $D_j$ without using the vector $iv_j$ and decrypts the cryptogram $ECC_{Dj}^*$ using this vector $iv_j$. Subsequently, the rest of the method is identical to what has already been described. In one simplified embodiment, since the datum $D_j$ does not need to be encrypted using the vector $iv_j$, it is also possible to not encrypt it. For example, the data line then contains the datum $D_j$ in cleartext and the cryptogram $ECC_{Dj}^*$. Thus, in the operation 178, the decryption of the datum $D_j$ is omitted since it is enough to extract it from the range of bits in which it is contained in the line $LD_j$.

In contrast, it is also possible to modify the structure of the lines $LD_j$ so that only the datum $D_j$ is encrypted using the vector $iv_j$. For example, the line $LD_j$ contains a cryptogram $D_j^*$ of the datum $D_j$ obtained by encrypting it using the function $f_{ka}(D_j; iv_j)$ and a cryptogram $ECC_{Dj}^*$ obtained by encrypting the code $ECC_{Dj}$ using an encryption function independent of the vector $iv_j$. In the operation 178, the module 28 decrypts the cryptogram $D_j^*$ using the vector $iv_j$ and decrypts the cryptogram $ECC_{Dj}^*$ without using this vector $iv_j$. In this case, the code $ECC_{Dj}$ may also not be encrypted and be contained in cleartext in the line $LD_j$.

In a simplified variant, the cryptogram $CD_j^*$ is constructed without using the identifier $IP_j$ and/or without using the address $@_j$ contained in the pointer $PD_j$. When the identifier $IP_j$ is not used to construct the cryptogram $CD_j^*$, then only the code $MAC_j$ allows an erroneous use of the pointer $PD_j$ to be detected.

Many embodiments of the function $f_{ka}$ are possible. For example, the function $f_{ka}$ may be as simple as a simple "Exclusive OR" logic operation between the concatenation $CD_j$ and the vector $iv_j$.

The encryption and decryption have been described in the particular case where the functions $f_{ka}$ and $f_{ka}^{-1}$ are encryption algorithms that use an "initialization vector" and, preferably, also a secret key ka. However, the functions $f_{ka}$ and $f_{ka}^{-1}$ may also be encryption/decryption algorithms in which an initialization vector is not used. Everything that has been described here then applies identically to such an encryption/decryption algorithm, the term "initialization vector" simply being replaced by the term "key".

In another variant, the keys ka and k' are the same.

As a variant, the function $F_{iv}$ is identical to the function $f_{ka}$ except that it is applied to the address $@_j$ and to the identifier $IP_j$. The function $F_{iv}$ may also use the same encryption algorithm as the function $f_{ka}$ but with an encryption key different from the key ka.

In one simplified variant, the function $F_{iv}$ is the identity function. In this case, the vector is systematically equal to the pointer $PD_j$.

The code $ECC_{Lj}$ may be replaced by a simple error detection code. In this case, the correcting operation 174 is omitted. In another variant, the code $ECC_{Lj}$ is constructed so as to allow an error to be detected, either solely in the cryptogram $CD_j^*$ or solely in the code $MAC_j$.

The code $ECC_{Lj}$ may be omitted. In this case, an error in the cryptogram $CD_j^*$ or in the code $MAC_j$ is detected solely during the execution of the operation 176 for verifying the integrity and authenticity of the cryptogram. The detection of an error using a MAC code is generally more complex that when a simple error detection code or a simple error correction code is used. In addition, when the code $ECC_{Lj}$ is omitted, in the case where there is an error in the cryptogram $CD_j^*$ or the code $MAC_j$, it is not possible to correct this error. In the latter case, for example, the execution of the secure function is therefore systematically interrupted in case of error.

As a variant, the operation 176 is systematically followed by the operation 178 even if it was not possible to confirm the integrity or the authenticity of the cryptogram. In this case, the operation 176 serves to trigger the flagging of an execution fault without interrupting the execution of the binary code.

To detect an erroneous use of the pointer $PD_j$, a single of the code $MAC_j$ and of the code $ECC_{Dj}$ is necessary. Thus, in a simplified embodiment, the code $MAC_j$ is omitted and the step 176 is omitted. In another simplified embodiment, it is the code $ECC_{Dj}$ that is omitted and the steps 184 and 186 are omitted.

The number of bits and the location of the bits in the second range of bits of the pointer $PD_j$ may be modified. For example, the second range of bits corresponds to the least significant bits of the pointer $PD_j$. In this case, it is necessary to modify the mask used to respectively extract the identifier $IP_j$ and the address $@_j$ from the pointer $PD_j$.

As a variant, the pointer $PD_j$ may contain a third range of bits that encodes, for example, access permissions to the line $LD_j$. Typically, these access permissions are then compared to access rights stored beforehand in the microprocessor 2 during the execution of the binary code 30. Read or write access to the line $LD_j$ is permitted only if the access rights of the microprocessor 2 correspond to the access permissions contained in the pointer $PD_j$.

What has been described here is not necessarily implemented for all the data pointers. For example, for certain data pointers, the securing is deactivated. To do this, the identifier $IP_j$ is replaced, in the pointer $PD_j$, with a zero value. The activation and/or deactivation of the securing of certain data pointers are/is for example programmed by adding a specific activation, and alternatively deactivation, instruction that is associated with this data pointer in the source code.

In other embodiments, the securing of the data pointers is only implemented for data lines stored in a specific part of the memory 4. For example, the securing of the pointers is only implemented for pointers that point to data stored in the stack 46. To do this, the instruction "Alloca" of the LLVM compiler is modified to return a pointer $PD_j$ containing the identifier $IP_j$. Similarly, what was described may be implemented only for pointers that point to a data line stored in the heap 48. In this case, only the instruction that dynamically allocates memory in the heap 48 is modified to return an enriched pointer. It is also possible to only make pointers that point to a datum stored in the part 44 of the memory 4 secure.

The securing of the data pointers may be omitted or deactivated. In this case, only the securing of the function pointers is implemented. To do this, for example, all the identifiers of data pointers have a zero value.

Variants of the Securing of the Function Pointers:

All the variants described above in the particular case of a data pointer may be transposed without difficulty to the case of a function pointer. For example, to do this, in each of the variants described above, it is enough to replace the symbols $D_j$, $LD_j$, $CD_j$, $CD_j^*$ with the symbols $I_j$, $LI_j$ and $CI_j$, $CI_j^*$, respectively.

The securement of the function pointers may be omitted or deactivated. In this case, only the securement of the data pointers is implemented. To do this, for example, all the identifiers of function pointers have a zero value.

In response to the execution of the instruction "Free($PD_j$)" it is possible either to modify solely the value of the identifier $IP_j$, or to solely erase the data from the freed memory region.

The securing of invalid pointers may be omitted in one simplified embodiment.

Variants Common to the Various Preceding Sections

The data $Da_j$ may be encrypted and decrypted using any method and not necessarily the method of application EP3457620A. In a greatly simplified embodiment, the data $Da_j$ are not encrypted.

The instructions $Ia_j$ that do not belong to functions called using a function pointer are, preferably, encrypted. For example, the method described in application EP3457620A may be employed to this end.

What has been described here also applies in a context in which no virtual memory mechanism is implemented. In this case, no virtual address is used and only physical addresses are used.

The key ka may be pre-stored in the memory 29. In this case, the cryptogram ka* may be omitted from the block 34.

The cryptogram k'* of the key k' encrypted with the public key $pk_{CPU}$ may be stored in the block 34. In this case, the key k' does not need to be pre-stored in the memory 29.

A line of code may be longer than a machine word. In this case, each line of code is composed of a plurality of machine words generally located at immediately consecutive memory addresses in the memory 4. In this case, a line of code is loaded into the microprocessor 2 not in a single read operation, but by executing a plurality of read operations. Each read operation loads, into the microprocessor, a respective machine word of the line of code.

All the embodiments described in this text and, in particular, the various variants, may be combined together.

SECTION VIII: ADVANTAGES OF THE DESCRIBED EMBODIMENTS

The embodiments described here allow flagging of an execution fault to be triggered as soon as a second pointer $PD_k$ is used to read or write a line of code only intended to be read using a first pointer $PD_j$ the identifier $IP_j$ of which is different from the identifier $IP_k$. This is explained in the case of a data pointer but the explanations given below may be transposed without difficulty to the case of a function pointer. During the read out of the line $LD_j$ using the pointer $PD_k$, it is the identifier $IP_k$ of this pointer $PD_k$ that is used in the construction of the second integrity tag $MAC_j'$ or $ECC_{Dj}'$. Thus, the constructed second integrity tag does not correspond to the first integrity tag $MAC_j$ or $ECC_{Dj}$ contained in this line $LD_j$ and constructed using the identifier $IP_j$. The verification of the integrity of the data line therefore systematically fails and an execution fault is flagged. The described methods therefore allow any attempt to read the line $LD_j$ using the pointer $PD_k$ instead of the pointer $PD_j$ to be flagged. By virtue of this, it is possible to detect attacks that use invalid pointers, such as dangling pointers.

In addition, the described embodiments also allow buffer overflow attacks such as stack overflow attacks or stack underflow attacks to be detected and flagged. In these attacks, the pointer $PD_k$ is used to write a new line $LD_k$ instead of the line $LD_j$. This replacement of the line $LD_j$ by the line $LD_k$ is then detected and flagged at the moment when the microprocessor 2 reads the line $LD_k$ using, to do so, the pointer $PD_j$.

Constructing the cryptogram $CD_j^*$ using the identifier of the first pointer $PD_j$ allows the datum $D_j$ to be kept secret during an attempt to read the line $LD_j$ using the second pointer $PD_k$. Specifically, when the pointer $PD_k$ is used to read the line $LD_j$, it is the identifier $IP_k$ and not the identifier $IP_j$ that is used to decrypt the cryptogram $CD_j^*$. This does not allow the datum $D_j$ to be obtained in cleartext.

Constructing the first integrity tag $MAC_j$ or encrypting the first integrity tag $ECC_{Dj}$, in addition, using the address contained in the first range of bits of the pointer $PD_j$ allows an unintentional movement of the line $LD_j$ in the memory to be detected and flagged. This notably allows the permutation of the line $LD_j$ with another line $LD_k$ to be detected.

Use of the secret key ka to construct the cryptograms $CD_j^*$ allows the security of the method to be increased.

The fact that the size of the pointer $PD_j$ is equal to the size of an address allows this enriched pointer to be loaded and manipulated like a conventional address and therefore in a minimum of instructions. In particular, it is not necessary to add additional instructions to read or write the identifier of the pointer from/to the memory 4.

Generating the first pointer in response to the execution of an instruction to dynamically allocate a memory region allows the described method to be implemented in the case where the memory is allocated dynamically during the execution of the binary code.

Modifying the identifier of the first pointer when the memory region to which it points is freed makes any subsequent use of this first pointer to read data from this memory region very difficult.

Storing, in the memory 4, the first pointer in encrypted form increases the security of the executing method.

The fact that the pointer $PD_j$ is stored in a line $LDa_j$ constructed in the same way as the line $LD_j$, but using a pointer identifier that is systematically equal to zero, allows the same steps to be employed to read and write this pointer $PD_j$ to/from the memory 4 as employed to read and write the line $LD_j$. This therefore simplifies the implementation and execution of the binary code 30.

Moreover, the encryption of the instructions $I_j$ allows the confidentiality of the binary code 30 to be guaranteed, this making it very difficult to reverse engineer the binary code. Verifying the integrity of the cryptogram $CI_j^*$ or $CD_j^*$ allows modifications of the binary code caused, for example, by attacks such as the injection of faults into the memory 4 to be detected. Verifying the authenticity of the instructions and data allows the addition of additional instructions to the binary code 30 by an attacker, for example with a view to introducing malicious software such as viruses into it, to be detected and made very difficult. Specifically, even if the attacker knows the algorithm used to encrypt the instructions $I_j$ and the data $D_j$, he/she does not know the secret key k' used to construct the code $MAC_j$.

The fact that the code $ECC_{Ij}$ or $ECC_{Dj}$ is an error correction code and not merely an error detection code allows the executing method to be made more robust to fault injection attacks. Specifically, in this case, the error correction code often allows the error introduced into the instruction $I_j$ or into the datum $D_j$ to be corrected so that, despite the presence of such errors, the secure function continues to execute correctly.

The use of the code $ECC_{Lj}$ allows an error in the cryptogram $CI_j^*$ or $CD_j^*$ or in the code $MAC_j$ to be detected more rapidly than if only the code $MAC_j$ is used for this purpose. The use of the code $ECC_{Lj}$ therefore allows the execution of the binary code to be accelerated.

The use of an error correction code for the code $ECC_{Lj}$ allows the claimed method to be made more robust with respect to attacks employing injection of faults into the memory 4 or into the device 6. Specifically, in this case, the error correction code often allows the cryptogram $CI_j^*$ or $CD_j^*$ or the code $MAC_j$ to be corrected so that, despite the presence of such errors, the secure function executes correctly.

The invention claimed is:

1. A method for executing, with a microprocessor, a binary code of a secure function configured to protect against an attack, said method comprising the following steps:
   a) storing, in a memory, a line of code, said line of code containing a cryptogram of the code and a first integrity tag allowing the integrity of the line of code to be verified,
   b) obtaining, with the microprocessor, a first pointer containing an address at which said line of code is stored, then
   c) executing, with the microprocessor, an instruction to read said line of code using the first pointer and executing the following operations with the microprocessor:
   c1) loading the first pointer into a register of the microprocessor,
   c2) loading the line of code stored at the address contained in the first pointer, then
   c3) verifying the integrity of the loaded line of code, said verification comprising constructing a second integrity tag from the cryptogram contained in the loaded line of code, then comparing said second integrity tag to the first integrity tag contained in the loaded line of code, then
   c4) when the second integrity tag does not correspond to the first integrity tag, i.e. when the verification of the integrity of the loaded line of code fails, the microprocessor systematically triggers the flagging of an execution fault, and
   c5) when the second integrity tag corresponds to the first integrity tag, i.e. when the loaded line of code is of integrity, the cryptogram of the code is decrypted to obtain a cleartext code and the triggering of an execution fault is inhibited;

wherein:
   obtaining the first pointer comprises obtaining a first pointer containing:
   a first range of bits containing the address of the line of code, and
   a second, different range of bits containing an identifier of the first pointer, the identifier of said first pointer allowing said first pointer to be uniquely identified among a set that contains a plurality of different pointers employed during the same execution of the binary code by the microprocessor,
   storing the line of code comprises storing a line of code wherein the first integrity tag is constructed or encrypted using the identifier of the first pointer,
   during the loading of the line of code, it is the address contained in the first range of bits of the loaded first pointer that is used and the identifier of the first pointer contained in the second range of bits is not used, and
   during the verification of the integrity of the loaded line of code, the second integrity tag is constructed, in addition, using the identifier of the first pointer contained in the second range of bits of the loaded first pointer, so that if a second pointer, different from the first pointer, is used instead of the first pointer to read or write said line of code, the verification of the integrity of the line of code fails.

2. The method as claimed in claim 1, wherein:
storing the line of code comprises storing a line of code wherein the cryptogram is constructed using the identifier of the first pointer contained in the second range of bits, and
during the decryption of the cryptogram of the code, the cryptogram is decrypted using the pointer identifier contained in the second range of bits of the loaded first pointer.

3. The method as claimed in claim 1, wherein:
storing the line of code comprises storing a line of code wherein the first integrity tag is also constructed or encrypted using the address contained in the first range of bits of the first pointer, and
during the verification of the integrity of the loaded line of code, the second integrity tag is constructed, in addition, using the address contained in the first range of bits of the loaded first pointer.

4. The method as claimed in claim 1, wherein:
storing the line of code comprises storing a line of code wherein the cryptogram is also constructed using a secret key independent of the identifier of the first pointer and of the address contained in said first pointer, and
during the decryption of the cryptogram, the cryptogram is also decrypted using said secret key, which is stored in a secure memory of the microprocessor before the start of the execution of the binary code by said microprocessor.

5. The method as claimed in claim 1, wherein obtaining the first pointer comprises obtaining a first pointer the size of which, in number of bits, is equal to the size of an address, i.e. to the maximum number of bits that an address transferred from the microprocessor to the memory via an address bus can contain.

6. The method as claimed in claim 1, wherein storing the line of code comprises storing a line of code wherein the code is a datum and step a) comprises, in response to the execution, by the microprocessor, of an instruction to write said datum to the memory at the address contained in the first pointer:

constructing the line of code containing the cryptogram of the datum and the first integrity tag constructed or encrypted using the identifier of the first pointer contained in its second range of bits, then storing the line of code thus constructed at the address contained in the first range of bits of the first pointer.

7. The method as claimed in claim 6, wherein step b) precedes step a) and step b) comprises:

b1) executing, with the microprocessor, an instruction to dynamically allocate a memory region in the memory, said allocation instruction being contained in the binary code of the secure function, then b2) in response:

reserving, in the memory, a free region of a preset size, to and from which the microprocessor may write and read lines of code, and generating the first pointer, which contains, in its first range of bits, an address of the reserved memory region and, in its second range of bits, the identifier of the first pointer.

8. The method as claimed in claim 7, wherein, in response to the execution, by the microprocessor, of an instruction to free the allocated memory region to which the first pointer points, the identifier of the first pointer is modified or the content of said memory region is rewritten with different values.

9. The method as claimed in claim 1, wherein operation c1) comprises:

executing, with the microprocessor, an instruction to load, from the memory, a data line containing a cryptogram of the first pointer, then decrypting the cryptogram of the first pointer to obtain the first pointer in cleartext.

10. The method as claimed in claim 9, wherein the data line containing the cryptogram of the first pointer is constructed in the same way as the line of code stored at the address contained in said first pointer but while replacing the identifier of the first pointer with a zero value.

11. The method as claimed in claim 1, wherein storing the line of code comprises storing a line of code wherein the code is the first executable instruction of a routine called by the microprocessor and the method comprises:

executing, with the microprocessor, an instruction to call said routine, then in response, step b) comprises loading the first pointer from a pre-stored table associating an identifier of said routine with the first pointer, then for each instruction line of the routine, executing operation c3) using, each time, the identifier of the loaded first pointer to construct the second integrity tag.

12. A binary code of a secure function able to be executed by a microprocessor, implementing an executing method as claimed in claim 1, wherein the binary code comprises:

a line of code containing the cryptogram of the code and a first integrity tag allowing the integrity of the line of code to be verified, a first pointer containing an address at which the line of code is stored, and an instruction to read the line of code using the first pointer which, when said instruction is executed by the microprocessor, triggers the execution of the following operations by the microprocessor:

c1) loading the first pointer into a register of the microprocessor, c2) loading the line of code stored at the address contained in the first pointer, then c3) verifying the integrity of the loaded line of code, said verification comprising constructing a second integrity tag from the cryptogram contained in the loaded line of code, then comparing said second integrity tag to the first integrity tag contained in the loaded line of code, then c4) when the second integrity tag does not correspond to the first integrity tag, i.e. when the verification of the integrity of the loaded line of code fails, the microprocessor systematically triggers the flagging of an execution fault, and c5) when the second integrity tag corresponds to the first integrity tag, i.e. when the loaded line of code is of integrity, the cryptogram of the code is decrypted to obtain a cleartext code and the triggering of an execution fault is inhibited;

wherein:

the first pointer contains:

a first range of bits containing the address of the line of code, and a second, different range of bits containing an identifier of the first pointer, the identifier of said first pointer allowing said first pointer to be uniquely identified among a set that contains a plurality of different pointers employed during the same execution of the binary code by the microprocessor, and the first integrity tag is constructed or encrypted using the identifier of the first pointer.

13. A data storage medium that is readable by a microprocessor, wherein said data storage medium contains a binary code as claimed in claim 12.

14. A microprocessor for implementing a method as claimed in claim 1, said microprocessor being configured to execute the following steps:

a) storing, in a memory, a line of code, said line of code containing a cryptogram of the code and a first integrity tag allowing the integrity of the line of code to be verified, b) obtaining, with the microprocessor, a first pointer containing an address at which said line of code is stored, then c) executing, with the microprocessor, an instruction to read said line of code using the first pointer and executing the following operations with the microprocessor:

c1) loading the first pointer into a register of the microprocessor, c2) loading the line of code stored at the address contained in the first pointer, then c3) verifying the integrity of the loaded line of code, said verification comprising constructing a second integrity tag from the cryptogram contained in the loaded line of code, then comparing said second integrity tag to the first integrity tag contained in the loaded line of code, then c4) when the second integrity tag does not correspond to the first integrity tag, i.e. when the verification of the integrity of the loaded line of code fails, the microprocessor systematically triggers the flagging of an execution fault, and c5) when the second integrity tag corresponds to the first integrity tag, i.e. when the loaded line of code is of integrity, the cryptogram of the code is decrypted to obtain a cleartext code and the triggering of an execution fault is inhibited;

wherein the microprocessor is also configured to:

during the obtaining of the first pointer, obtain a first pointer containing:

a first range of bits containing the address of the line of code, and a second, different range of bits containing an identifier of the first pointer, the identifier of said first pointer allowing said first pointer to be uniquely identified among a set that contains a plurality of different pointers employed during the same execution of the binary code by the microprocessor, during the storing of the line of code, to store a line of code wherein the first integrity tag is constructed or encrypted using the identifier of the first pointer, during the loading of the line of code, it is the address contained in the first range of bits of the loaded first pointer that is used and the identifier of the first pointer contained in the second range of bits is not used, and during the verification of the integrity of the loaded line of code, the second integrity tag is constructed, in addition, using the identifier of the first pointer contained in the second range of bits of the loaded first pointer, so that if a second pointer, different from the first pointer, is used instead of the first pointer to read or write said line of code, the verification of the integrity of the line of code fails.

15. A compiler able to automatically convert a source code of a secure function into a binary code of said secure function, wherein the compiler is able to automatically convert the source code into a binary code as claimed in claim 12, said compiler being configured to generate, for at least one code contained in the source code:

a line of code containing the cryptogram of said code and a first integrity tag allowing the integrity of the line of code to be verified, a first pointer containing an address at which the line of code is stored, and an instruction to read the line of code using the first pointer that, when it is executed by the microprocessor, triggers the execution of the following operations by the microprocessor:

c1) loading the first pointer into a register of the microprocessor, c2) loading the line of code stored at the address contained in the first pointer, then c3) verifying the integrity of the loaded line of code, said verification comprising constructing a second integrity tag from the cryptogram contained in the loaded line of code, then comparing said second integrity tag to the first integrity tag contained in the loaded line of code, then c4) when the second integrity tag does not correspond to the first integrity tag, i.e. when the verification of the integrity of the loaded line of code fails, the microprocessor systematically triggers the flagging of an execution fault, and c5) when the second integrity tag corresponds to the first integrity tag, i.e. when the loaded line of code is of integrity, the cryptogram of the code is decrypted to obtain a cleartext code and the triggering of an execution fault is inhibited;

wherein:

the first pointer contains:

a first range of bits containing the address of the line of code, and a second, different range of bits containing an identifier of the first pointer, the identifier of said first pointer allowing said first pointer to be uniquely identified among a set that contains a plurality of different pointers employed during the same execution of the binary code by the microprocessor, and the first integrity tag is constructed or encrypted using the identifier of the first pointer.

* * * * *